United States Patent [19]
Saya et al.

[11] Patent Number: 5,213,000
[45] Date of Patent: May 25, 1993

[54] MOTOR OUTPUT SHAFT POSITIONING DEVICE

[75] Inventors: Tsutomu Saya; Hiroaki Nakahashi; Shinichi Taniguchi; Tsutomu Watanabe, all of Matsudo, Japan

[73] Assignee: Mabuchi Motor Co., Ltd., Chiba, Japan

[21] Appl. No.: 792,239

[22] Filed: Nov. 14, 1991

[30] Foreign Application Priority Data

Nov. 11, 1990 [JP] Japan .................. 2-310282
Aug. 29, 1991 [JP] Japan .................. 3-217655

[51] Int. Cl.$^5$ ............................................. F16H 55/22
[52] U.S. Cl. .................................... 74/425; 74/606 R; 384/610; 29/898.049; 29/898.05; 29/898.15; 264/262; 264/263
[58] Field of Search ............ 74/606 R, 425; 384/610; 29/898.049, 898.05, 898.055, 898.15; 264/262, 263

[56] References Cited

U.S. PATENT DOCUMENTS

| | | | |
|---|---|---|---|
| 3,650,004 | 3/1972 | Bergstrom | 29/898.049 |
| 4,290,181 | 9/1981 | Jackson | 29/898.049 |
| 5,090,261 | 2/1992 | Nakatsukasa | 384/610 X |

Primary Examiner—Allan D. Herrmann
Assistant Examiner—William O. Trousdell
Attorney, Agent, or Firm—McGlew and Tuttle

[57] ABSTRACT

A motor output shaft positioning device for motors with worm reduction gears for outputting the output of a motor output shaft via a worm reduction gear, comprising a gear case having a hollow part for housing a worm fitted to a motor output shaft and a worm wheel meshing with the worm and receiving an end of the motor output shaft; the hollow part receiving a bearing of the motor output shaft and a steel ball; a bearing holder having projections projecting towards the bottom of the hollow part, and a filler that is injected into the hollow part through a filling hole formed on the hollow part.

8 Claims, 4 Drawing Sheets

MOTOR OUTPUT SHAFT POSITIONING DEVICE

BACKGROUND OF THE INVENTION

1. Field of the Invention

This invention relates generally to a motor output shaft positioning device for accurately positioning the motor output shaft in the axial direction of the shaft, and more particularly to a motor output shaft positioning device for minimizing the axial movement of the rotor and preventing mechanical noise caused by the friction and play of the motor output shaft by accurately positioning the motor output shaft in the axial direction.

2. Prior Art

In general, the axial movement of a motor output shaft is adjusted by using a nut, a screw having a tip which is machined into a special shape, and a steel ball, rotating the motor in a state where the screw comes in contact with an end of the output shaft of the rotor, fixing the screw by tightening the nut at a location where no-load current and the axial movement of the shaft are minimized. Such an adjustment method of the axial movement of the motor output shaft not only involves a considerable degree of skill in fixing the screw and the nut, but also requires much time for the adjustment process.

To solve these problems, a motor output shaft positioning method as disclosed in Published and Examined Patent Application No. 56701/1986, is publicly known.

FIG. 3 shows a cross-sectional view of the essential part of a bearing of assistance in explaining the conventional motor output shaft positioning method.

In FIG. 3, a worm wheel is housed in the lower part (not shown) of a gear case 31, and a motor output shaft 32 fitted to a worm meshing with the worm wheel is supported by a bearing projection 33 protruding radially inside the gear case 31.

At the tip of the motor output shaft 32 formed is a conical projection 34 protruding toward a hollow part 35 defined by the gear case 31 and the bearing projection 33. In the hollow part 35 formed is an injection passage 36 connecting the inside and outside of the hollow part 35.

In this state, a nozzle 37 of an injection molder for injecting a synthetic resin 38 is connected to the injection passage 36 to inject the synthetic resin 38 into the hollow part 35. The synthetic resin 38, which is polyacetal resin, for example, is injected at a lower rate than the normal injection rate. After the resin 38 is injected into the hollow part 35, the surface of the resin 38 is half solidified to form a skin layer 39. In this way, the synthetic resin 38 is prevented from leaking through a gap 40 formed between the motor output shaft 32 and the bearing projection 33.

After that, the synthetic resin 38 is injected under increased injection pressure, allowed to cool and cure to form an appropriate gap between the conical projection 34 of the motor output shaft 32 and the synthetic resin 38.

Because injection pressure has to be increased only after the skin layer 39 has been formed as the synthetic resin 38 that was first injected was allowed to cool and cure, however, much time and labor are needed and injection pressure or injection temperature has to be precisely controlled.

Furthermore, if a skin layer 39 is not formed adequately during the first injection, the synthetic resin 38 may leak from the gap between the motor output shaft 32 and the bearing projection 33.

In addition, extremely troublesome adjustment is needed to maintain accuracies with respect to the relative positions of the synthetic resin 38 injected into the hollow part 35 and the conical projection 34 of the motor output shaft 32, and with respect to the rotatable gap between them.

SUMMARY OF THE INVENTION

This invention is intended to solve these problems. It is an object of this invention to provide a motor output shaft positioning device that causes no axial play between the motor output shaft and the bearings.

To accomplish this object, this invention employs a motor output shaft positioning device for motors with worm reduction gears for outputting the output of a motor shaft via a worm reduction gear, comprising a gear case (17) having a hollow part (10) for housing a worm (6) fitted to a motor output shaft (4) and a worm wheel (7) meshing with the worm (6) and receiving an end of the motor output shaft (4); the hollow part (10) receiving a bearing (5) of the motor shaft (4) and a steel ball (9); a bearing holder having locking support legs (25) and/or axial-play adjusting projections (29), formed towards the bottom (26) of the hollow part (10), and a filler (23) that is injected into the hollow part (10) through a filling hole (28) formed on the hollow part (10).

A sealing projection (24) for the filler (23) is formed on the periphery of the bearing holder (22), and the filler (23) is composed of a synthetic resin that cures after filling.

In addition, a inspection hole (27) for adjusting the position of the bearing holder (22) and checking to see if the resin is charged to the full is provided on the bottom (26) of the hollow part (10).

The bearing holder houses the bearing and the steel ball, and the motor output shaft is inserted into the bearing.

After the position of the bearing holder is adjusted using a jig through the inspection hole provided on the hollow part, the synthetic resin is charged through the filling hole, and the bearing holder is fixedly fitted at a proper position as the synthetic resin is cured.

The position of the bearing holder is adjusted by forcing the axial-play adjusting projections formed on the bottom of the bearing holder onto the bottom of the hollow part. The synthetic resin is charged through the filling hole in a state where the axial-play adjusting projections, which are formed slightly longer, are buckled as they hit against the bottom of the hollow part. The resin is then allowed to cure to secure the bearing holder in position.

With this simple device, the motor output shaft can be accurately adjusted in the axial direction, causing no play around this portion.

DETAILED DESCRIPTION OF THE PREFERRED EMBODIMENTS

Figure 1:
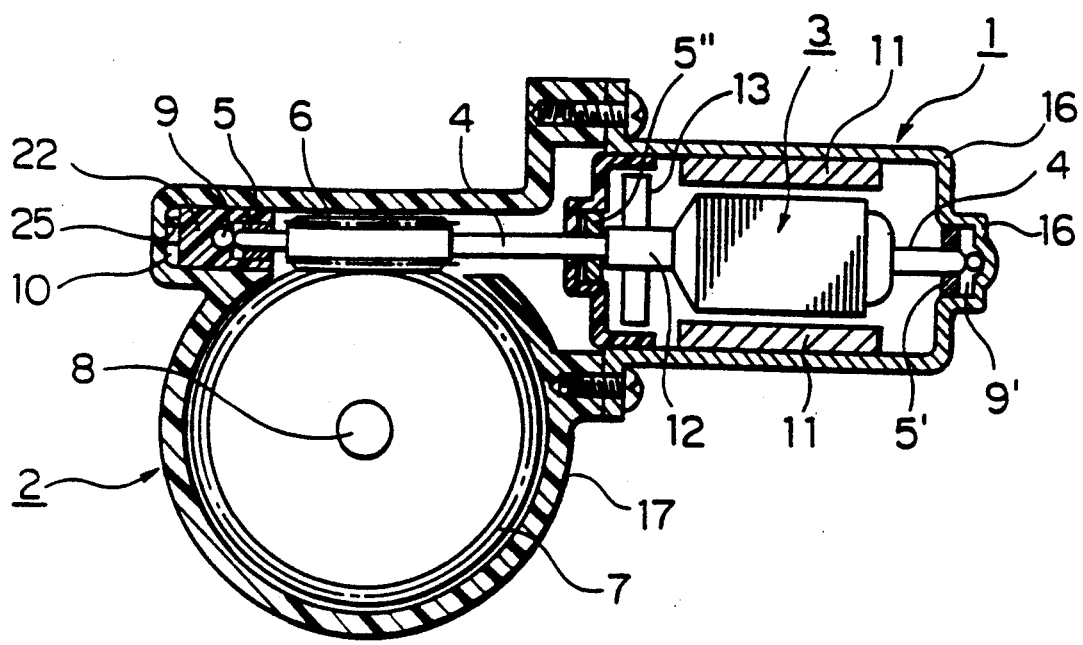
FIG. 1 is a schematic diagram illustrating a motor and reduction gears of assistance in explaining the motor output shaft positioning device of this invention.

FIG. 1 is a schematic diagram illustrating a motor and reduction gears of assistance in explaining the motor output shaft positioning device of this invention. FIGS. 2A through 2D are cross-sectional views of the bearing of the motor output shaft.

In FIG. 1, reference numeral 1 refers to a motor proper to which a reduction gear unit 2 is connected; 3 to a rotor to which a motor output shaft 4 is connected. The motor output shaft 4 is supported by three bearings 5, 5' and 5" (radial bearings, for example). On the motor output shaft 4 formed is a worm 6 with which a worm wheel 7 is meshed. An output shaft 8 is extended from the center of the worm wheel 7 to be connected to an automobile windshield wiper, for example. An end of the motor output shaft 4 is supported by a steel ball 9, and the steel ball 9 and the bearing 5 are housed and fixedly fitted to the bearing holder 22. By forming the outer circumferential surface of the bearing 5 into a spherical shape, a slight misalignment of the motor output shaft 4 can be automatically adjusted. A hollow part 10 is formed between the bearing holder 22 and the gear case 17.

Inside a motor case 16 of the motor proper 1 formed are a magnet 11, a commutator 12 and brushes 13, as shown in the figure, to operate as a standard d-c motor.

Figure 2A:
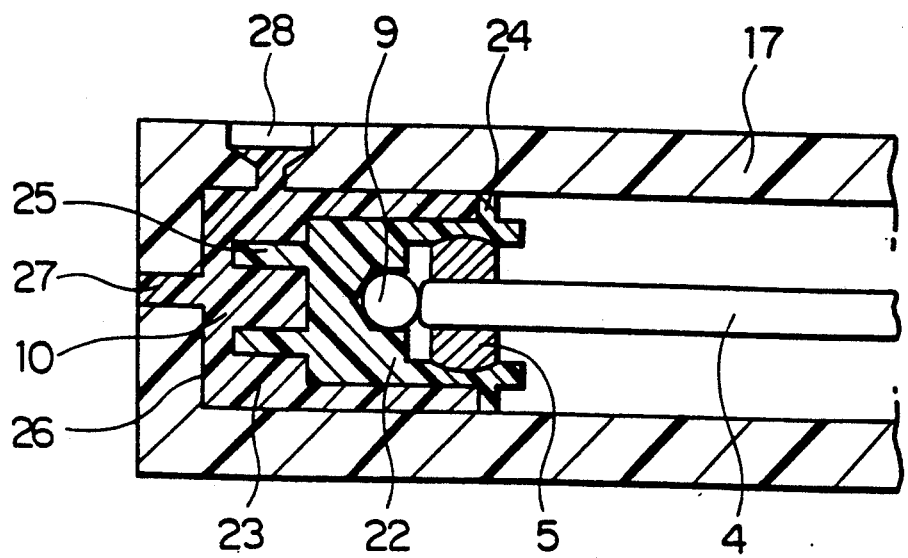
FIGS. 2A, 2B, 2C and 2D are cross-sectional views of the bearing of the motor output shaft.

Next, the bearing holder 22 will be described, referring to FIG. 2A.

The bearing holder 22 has a sealing projection 24 formed on the periphery thereof to prevent the filler 23 from leaking from the gap between the periphery of the bearing holder 22 and the gear case 17. The support legs 25 protrude from the bottom of the bearing holder 22. Four support legs 25, for example, are provided to prevent the relative rotation of the bearing holder 22 and the filler 23 after the filler 23, which will be described later, is charged and solidified.

The inspection hole 27, on the other hand, is formed at the essentially middle part of the bottom 26 of the hollow part 10 into which the bearing holder 22 is inserted, while the filling hole 28 is formed on the upper part of the hollow part 10 shown in FIG. 2.

The axial force exerted on an end of the motor output shaft 4 is received by the steel ball 9'. The axial force exerted on the other end of the motor output shaft 4 is received by the steel ball 9 placed in the bearing holder 22. The radial force exerted on the motor output shaft 4 is received by three radial bearings 5, 5' and 5". In this state, the bearing holder 22 is pushed by a pin, for example, to position the bearing holder 22 to a location where no axial play occurs, and then the filler 23 is injected through the filling hole 28. The filler 23 is prevented from leaking by the sealing projection 24 of the bearing holder 22, and overflown from the inspection hole 27 after charged to the full. The filler 23 is selected from among those resins which cure after filling, such as a two-component type epoxy resin, or a thermosetting resin. As the filler 23 cures, the support legs 25 protrude into the filler 23 to prevent the relative rotation of the bearing holder 22 and the filler 23. Furthermore, since the filler 23 is injected and cured in a state where adjustment is effected to eliminate axial play, the bearing holder 22 can be secured in position without axial play.

Figure 2B:
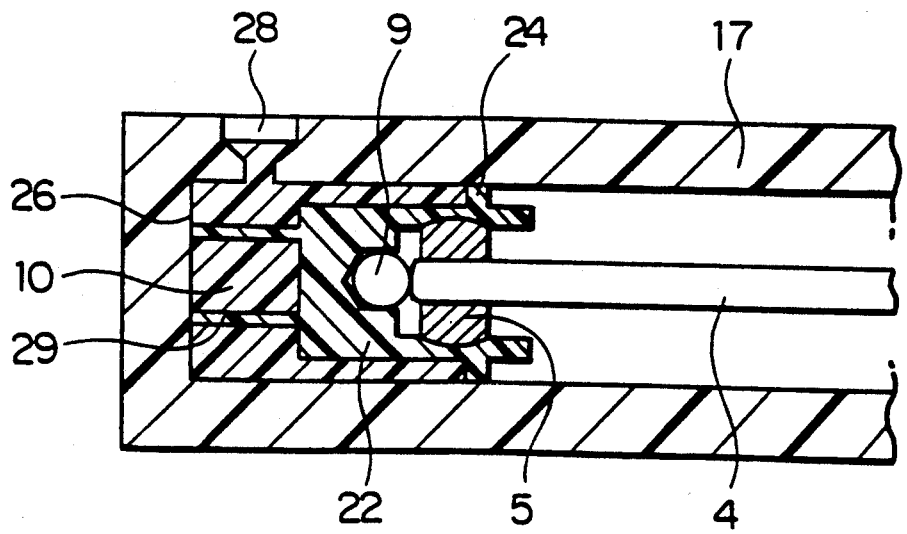

FIG. 2B shows another embodiment of the bearing holder 22. In FIG. 2B, the axial-play adjusting projection 29 is formed on the tip of the bearing holder 22. As in the previous embodiment, the motor output shaft 4 is supported by the bearing 5, 5' and 5" and steel balls 9 and 9'. In this state, the axial-play adjusting projections 29 hit against the bottom 26 of the hollow part 10 to buckle, eliminating the axial play of the motor output shaft 4. In this way, the bearing holder 22 is secured in position without axial play by the filler 23 injected through the filling hole 28. In this embodiment, the inspection hole 27 is not provided.

The diameter of the axial-play adjusting projections 29 is set to such a value that the projections 29 can be buckled at a load lower than the axial load exerted in actual operation. Consequently, the diameter of the axial-play adjusting projections 29 varies depending on the material of the bearing holder 22.

Figure 2C:
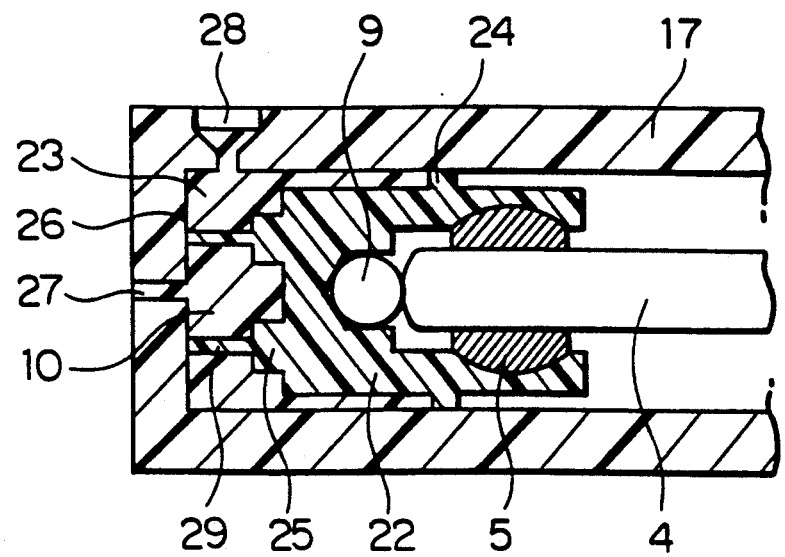

FIG. 2C shows still another embodiment of the bearing holder 22. In FIG. 2C, the support legs 25 protrude from the bottom of the bearing holder 22, and the axial-play adjusting projections 29 are formed at the tips thereof. Four support legs 25, for example, are provided to prevent the relative rotation of the bearing holder 22 and the filler 23 after the filler 23, which will be described later, is charged and cured.

The axial-play adjusting projections 29 are used to eliminate the axial play of the motor output shaft 4 as the projections 29 hit against the bottom 26 of the hollow part 10 and buckle. The diameter of the axial-play adjusting projections 29 is set to such a value that the projections 29 can be buckled by a load lower than the axial load exerted in actual operation. Consequently, the diameter of the axial-play adjusting projections 29 varies depending on the material of the bearing holder 22.

The diameter of the support legs 25, on the other hand, is set to a value higher than that of the axial-play adjusting projections 29, that is, to such a value that the support legs 25 are hardly buckled by the axial load exerted in actual operation. In this way, the part of the axial-play adjusting projection 29 consisting of one projection absorbs axial play as it buckles, while the part of the support leg 25 of the same projection prevents the rotation of the bearing holder 22 by the rigidity thereof.

The filler 23 is injected through the filling hole 28 in a state where the axial-play adjusting projections 29 hit against the bottom 26 of the bearing holder 22 and buckle. The filler 23 is prevented from leaking by the sealing projection 24 of the bearing holder 22, and overflown from the inspection hole 27 after charged to the full. The filler is selected from among those resins which are cured after filling. As the filler 23 is cured, the bearing holder 22 is held in position to prevent the axial play of the motor output shaft 4.

Figure 2D:
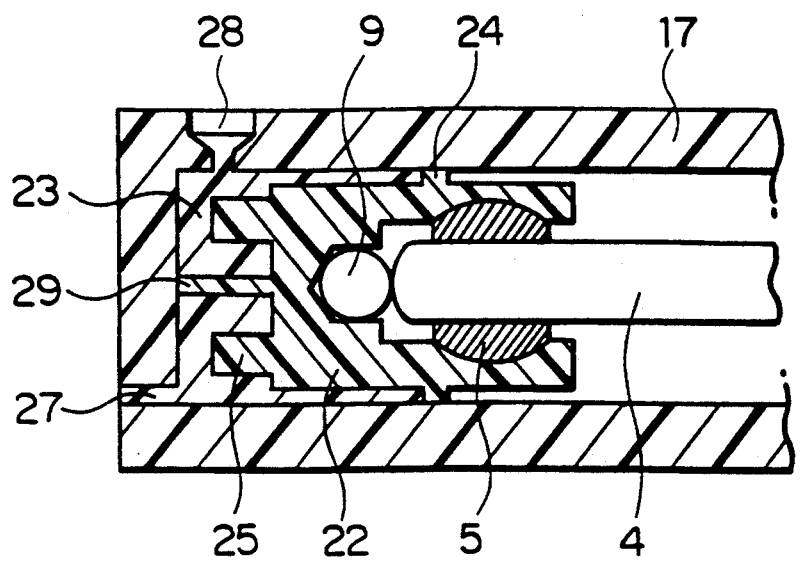
Figure 3:
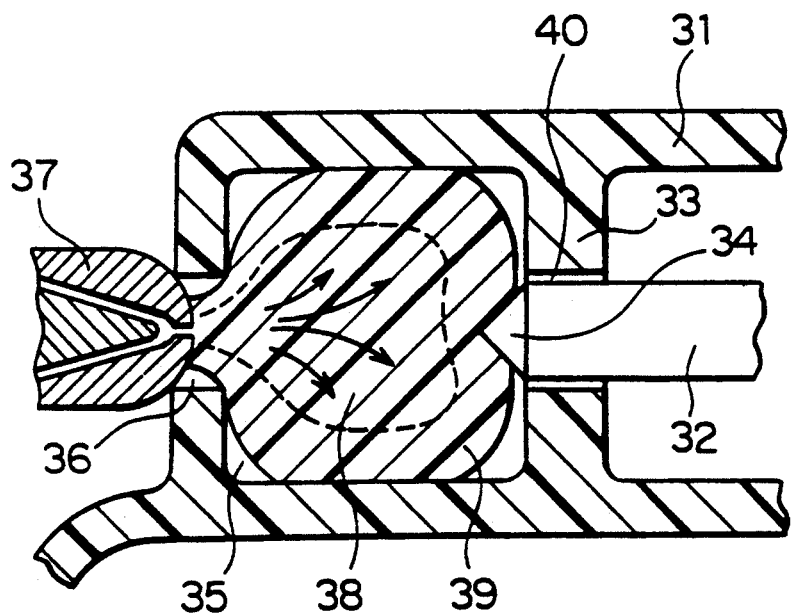
FIG. 3 is a cross-sectional view of the essential part of the bearing of assistance in explaining the conventional method of positioning the motor output shaft.

FIG. 2D shows still another embodiment of the bearing holder. Shown in FIG. 2D is an embodiment where the locking support legs 25 and the axial-play adjusting projections 29 are provided independently as separate projections. Four support legs 25, for example, are provided, and one axial-play adjusting projection 29 is provided at the center of the bearing holder projection 29 is provided at the center of the bearing holder holder 22 (center of the four support legs 25). In this embodiment, the inspection hole 27 is provided, not at the center of the bottom 26 of the hollow part 10, but on the opposite side of the filling hole 28 of the bottom 26 so as to prevent the axial-play adjusting projections 28 from interfering with the inspection hole 27.

As described above, this invention makes it possible to precisely position the motor output shaft in the axial direction without troublesome work, thus eliminating mechanical noise produced by the motor output shaft, the bearings, and so on.

What is claimed is:

1. A motor output shaft positioning device for a motor with worm reduction gear (1) outputting the output of a motor output shaft (4) via a worm reduction gear, comprising a gear case (17) having a hollow part (10) for housing a worm (6) fitted to a motor output shaft (4) and a worm wheel (7) meshing with said worm (6) and receiving an end of said motor output shaft (4); said hollow part (10) receiving a bearing (5) of said motor output shaft (4) and a steel ball (9); a bearing holder (22) having projections projecting towards the bottom (26) of said hollow part (10), and a filler (23) that is injected into said hollow part (10) through a filling hole (28) formed on said hollow part (10).

2. A motor output shaft positioning device as set forth in claim 1 wherein said projections serve as support legs for preventing the relative rotation of said bearing holder (22) and said filler (23).

3. A motor output shaft positioning device as set forth in claim 1 wherein said projections adjust said motor output shaft (4) to eliminate axial play thereof upon said projections hitting said bottom of said hollow part.

4. A motor output shaft positioning device as set forth in claim 1 wherein said projections has a function to act as support legs for preventing the relative rotation of said bearing holder (22) and said filler (23) and adjust said motor output shaft (4) to eliminate axial play thereof upon said projections hitting said bottom of said hollow part.

5. A motor output shaft positioning device as set forth in claim 1 wherein said projections include projections 925) serving as support legs for preventing the relative rotation of said bearing holder (22) and said filler (23), and projections (29) which adjust said motor output shaft (4) to eliminate axial play upon said projections (29) hitting said bottom of said hollow part.

6. A motor output shaft positioning device as set forth in claim 1 wherein a sealing projection (24) for preventing said filler (23) from leaking is provided on the periphery of said bearing holder (22).

7. A motor output shaft positioning device as set forth in claim 1 wherein said filler (23) consists of a synthetic resin which cures after filling.

8. A motor output shaft positioning device as set forth in claim 1 wherein an inspection hole (27) is formed on the bottom (26) of said hollow part (10) to adjust the position of said bearing holder (22) and to see if said filler (23) is charged to the full.

* * * * *